US009021354B2

(12) United States Patent
Helms

(10) Patent No.: US 9,021,354 B2
(45) Date of Patent: Apr. 28, 2015

(54) CONTEXT SENSITIVE REMOTE DEVICE

(75) Inventor: Jan-Hinnerk Helms, Hamburg (DE)

(73) Assignee: Apple Inc., Cupertino, CA (US)

( * ) Notice: Subject to any disclaimer, the term of this patent is extended or adjusted under 35 U.S.C. 154(b) by 501 days.

(21) Appl. No.: 12/757,426

(22) Filed: Apr. 9, 2010

(65) Prior Publication Data

US 2011/0252318 A1  Oct. 13, 2011

(51) Int. Cl.
*G06F 3/01* (2006.01)
*G06F 3/00* (2006.01)
*G06F 9/44* (2006.01)

(52) U.S. Cl.
CPC ................................ *G06F 9/4443* (2013.01)

(58) Field of Classification Search
USPC ................................................. 715/740, 702
See application file for complete search history.

(56) References Cited

U.S. PATENT DOCUMENTS

| | | | |
|---|---|---|---|
| 6,232,972 B1 * | 5/2001 | Arcuri et al. ................... 715/815 |
| 7,009,528 B2 * | 3/2006 | Griep ......................... 340/12.54 |
| 7,870,496 B1 * | 1/2011 | Sherwani ....................... 715/761 |
| 2001/0034859 A1 * | 10/2001 | Swoboda et al. ................ 714/39 |
| 2003/0222923 A1 * | 12/2003 | Li ................................... 345/815 |
| 2005/0039133 A1 * | 2/2005 | Wells et al. ..................... 715/740 |
| 2006/0004834 A1 * | 1/2006 | Pyhalammi et al. ........... 707/102 |
| 2006/0074844 A1 * | 4/2006 | Frankel et al. ..................... 707/1 |
| 2007/0105591 A1 | 5/2007 | Chan |
| 2008/0016465 A1 * | 1/2008 | Foxenland .................... 715/828 |
| 2008/0228732 A1 * | 9/2008 | Morisawa ......................... 707/3 |
| 2009/0156251 A1 | 6/2009 | Cannistraro et al. |
| 2009/0174653 A1 * | 7/2009 | Shin et al. ...................... 345/156 |
| 2009/0239587 A1 | 9/2009 | Negron et al. |
| 2009/0254839 A1 * | 10/2009 | Kripalani et al. .............. 715/753 |
| 2009/0262084 A1 * | 10/2009 | Yu .................................. 345/173 |
| 2010/0169790 A1 * | 7/2010 | Vaughan et al. ............... 715/740 |
| 2011/0191674 A1 * | 8/2011 | Rawley et al. ................. 715/702 |
| 2011/0258547 A1 * | 10/2011 | Symons et al. ................ 715/723 |

FOREIGN PATENT DOCUMENTS

| | | |
|---|---|---|
| WO | 2009/114247 A2 | 9/2009 |
| WO | 2009/120984 A1 | 10/2009 |

OTHER PUBLICATIONS

GarageBand, "Getting Started," Sep. 2007, Apple, Inc.*

(Continued)

*Primary Examiner* — Matt Kim
*Assistant Examiner* — Mary Dixon
(74) *Attorney, Agent, or Firm* — Fish & Richardson P.C.

(57) ABSTRACT

A user can make selections of one or more items, defined as a context, in a graphical user interface on a computer running software. The computer sends data to a connected wireless device, and the data is representative of the context. The wireless touch screen device displays one or more commands corresponding to the received context data and the commands can control the program on the computer. The wireless touch screen device then receives a user input on the wireless touch screen device to execute one of the one or more commands. The wireless touch screen device then sends the user command to the computer, wherein the computer executes the command and controls the program according to the user command. For example, this can allow remote control of a DAW, video-editing software, photo-editing software, and word processing software by a coupled wireless touch screen device.

24 Claims, 15 Drawing Sheets

(56) References Cited

OTHER PUBLICATIONS

Apple iTunes Store, "Remote App," Apple Inc., Cupertino, CA (Available online at http://www.apple.com/itunes/remote/, last visited Feb. 15, 2010).

Novation Products, "Software Novation Automap for iPhone/iPod touch Automap for iPhone and iPod Touch," Novation, A division of Focusrite Audio Engineering Ltd., High Wycombe, Bucks, United Kingdom (Available online at http://www.novationmusic.com/products/software/automap_for_iphone_ipod_touch, last visited Apr. 8, 2010).

* cited by examiner

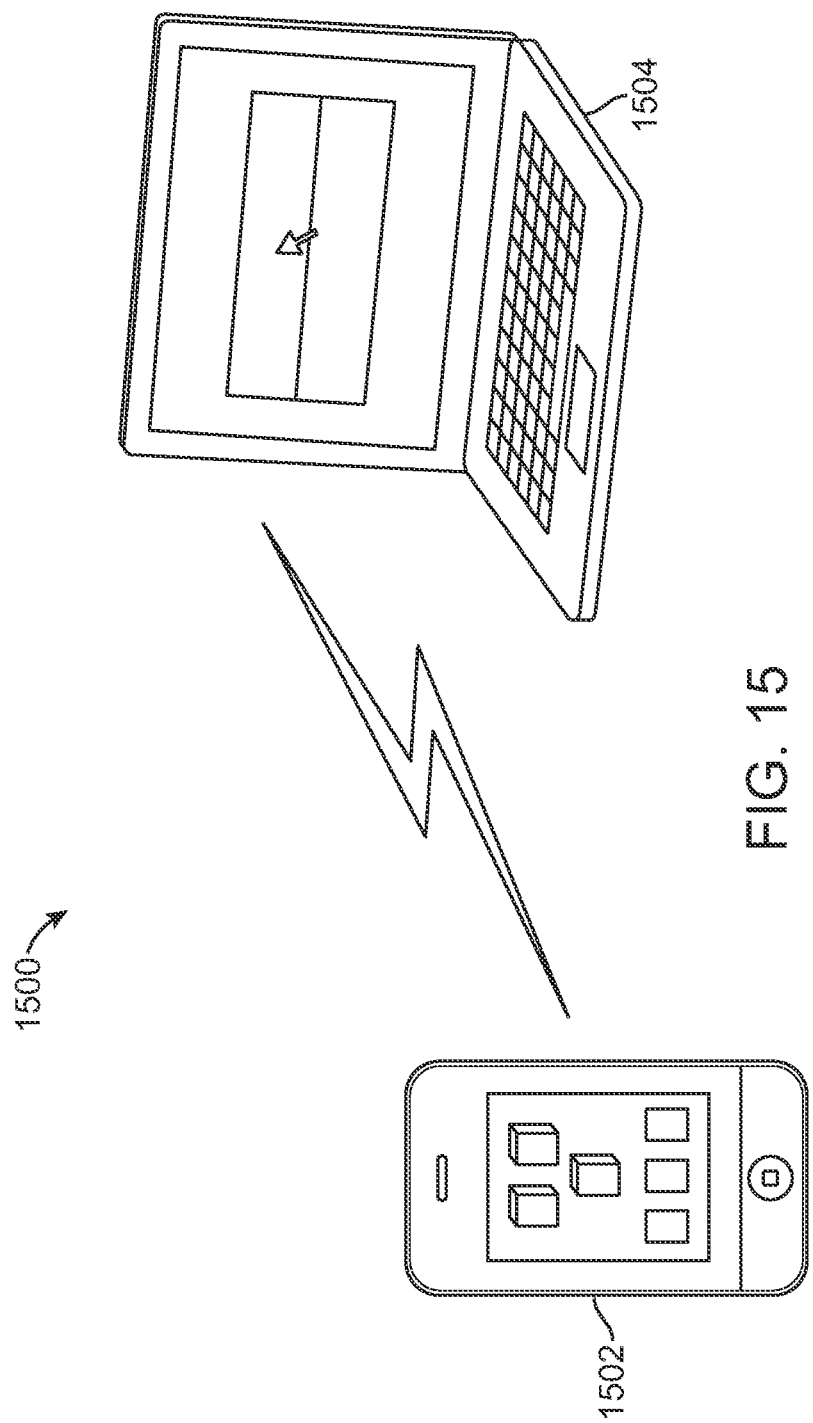

CONTEXT SENSITIVE REMOTE DEVICE

FIELD

The following relates to remote devices for auxiliary input into a computer, and more particularly for context sensitive wireless touch screen devices for auxiliary input into a computer.

BACKGROUND

Users can benefit from an auxiliary input to a computer running software, such as a digital audio workstation (DAW), video-editing software, photo-editing software, and word processing software.

Many users have at least one wireless touch screen device, such as a smart phone device or digital media player, in addition to a computer running software. Users can benefit from an integration of a computer running software with a wireless touch screen device, in order to use the wireless touch screen device as an auxiliary input into the computer running software.

However, current systems for utilizing a wireless touch screen device as an auxiliary input for a computer running software such as an additional input for a computer running software only allow one-way communication. For example, in a DAW environment, a wireless touch screen device can generate MIDI commands in response to a user command. A user must then typically configure the DAW to interpret the received MIDI command and execute a linked command in the computer software, for example, to play an arrangement upon receiving a C3 MIDI command. Users can benefit from a system utilizing a wireless touch screen device as an auxiliary input that engages in two-way communication with a computer running software such as a DAW. This two-way communication can allow the wireless device to present an appropriate command menu based on user selections made within a graphical user interface of the computer running software. The presented command menu can dynamically change as changes to the user selections are made within the graphical user interface.

SUMMARY

Processor-implemented methods, devices, and systems for using a wireless touch screen in two-way communication as an input device for a computer running software are disclosed. A user can make selections of one or more items in a graphical user interface on a computer running software. The one or more selections can be defined as a context. The computer sends data to a connected wireless touch screen device, wherein the data is representative of the context defined by the one or more selections in the graphical user interface. The wireless touch screen device displays one or more commands corresponding to the received context data and the commands can control the program on the computer. The wireless touch screen device then receives a user input on the wireless touch screen device to execute one of the one or more commands. The wireless touch screen device then sends the user command to the computer, wherein the computer executes the command and controls the program according to the user command. For example, this can allow remote control of a DAW, video-editing software, photo-editing software, and word processing software by a connected wireless touch screen device.

Many other aspects and examples will become apparent from the following disclosure.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

FIG. 15 illustrates an example system for communicatively coupling a wireless touch screen device and a computer running software.

DETAILED DESCRIPTION

The method for coupling a wireless touch screen device and a personal computer can be implemented on a computer. The computer can be a data-processing system suitable for storing and/or executing program code. The computer can include at least one processor that is coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data-processing systems or remote printers or storage devices through intervening private or public networks. Modems, cable modems, and Ethernet cards are just a few of the currently available types of network adapters. In one or more embodiments, the computer can be a desktop computer, laptop computer, or dedicated device.

The disclosed technology allows a smart phone with a touch-sensitive display to function as a remote control device for a computer running a software application, by wirelessly coupling the smart phone and computer. In response to a detected context, which is defined by user selections within a graphical user interface in the software application, the smart phone can display available menu commands, shortcut menu commands, key commands, or on-screen controls for the detected context. On-screen controls can include buttons, faders, text strings, and knobs. By manipulation of these on-screen controls, a user can cause the smart phone to send a user input to the computer running the software application, and control that application.

The displayed commands can be commands that a specific user engages most often for a detected context. In other words, the displayed commands can be "most frequently chosen" commands by a user for the detected context. The displayed commands can correspond, but are not limited to, to commands that the software application would display in response to a user "right click" or "control click" in a given context defined by one or more user selections in a graphical user interface.

In one embodiment of the disclosed technology, the smart phone will "follow" and assist the user when working with a software application. The smart phone will dynamically update its displayed screen controls based on user selections in the graphical user interface of an application.

Figure 1:
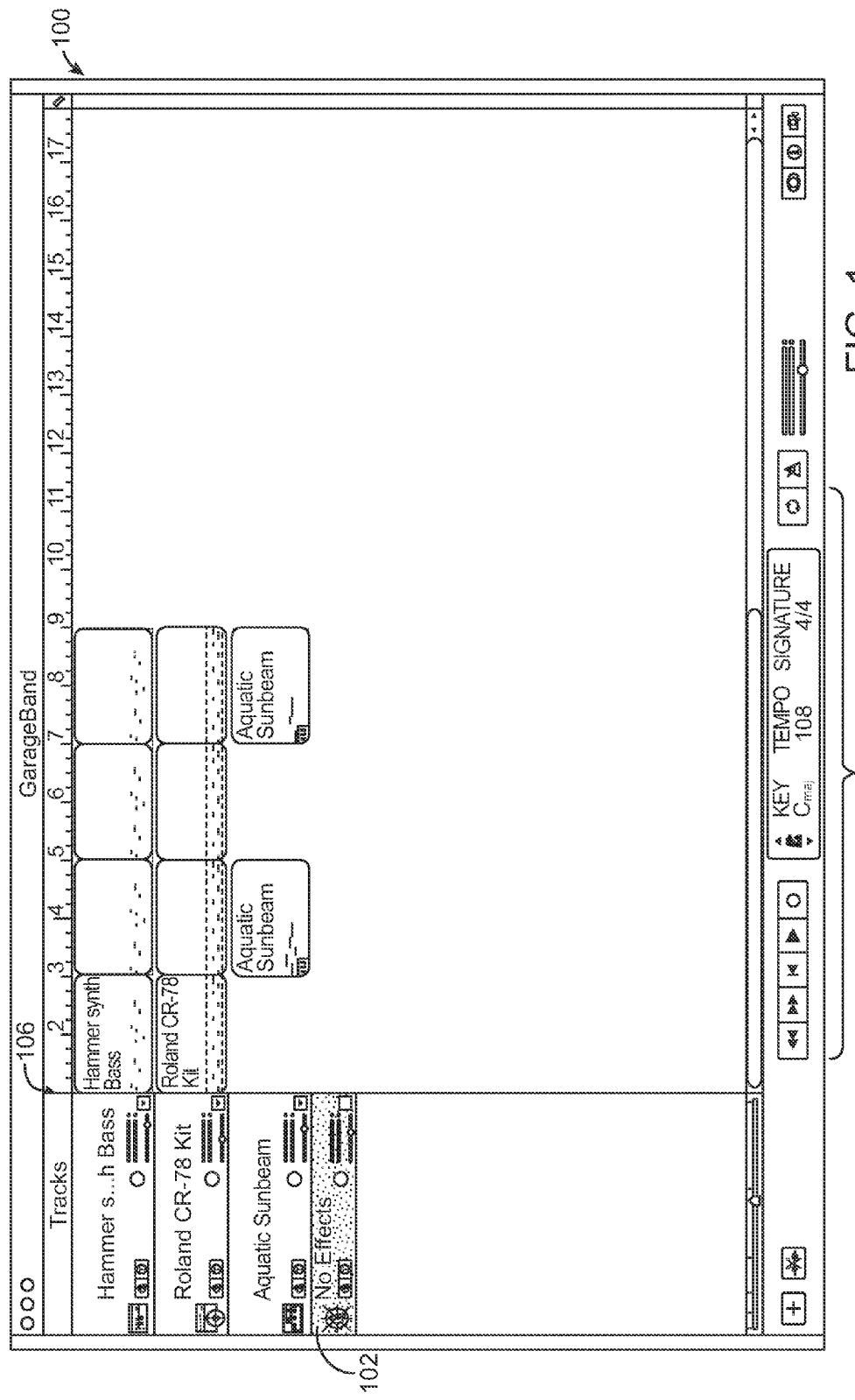
FIG. 1 illustrates a musical arrangement in which a user has selected a real instrument track and no regions.

FIG. 1 illustrates a musical arrangement in which a user has selected a real instrument track and no regions. The musical arrangement of FIG. 1 as displayed on a digital audio workstation (DAW) includes MIDI (software instrument) and audio (real instrument) tracks. Software instrument tracks include MIDI data in regions that play through a selected software instrument. Real instrument tracks contain audio data in regions that is recorded audio such as a singer's vocal or recorded acoustic guitar. The musical arrangement 100 can include one or more tracks, with each track having one or more audio regions for real instrument tracks or MIDI regions for software instrument tracks. As shown, the tracks can be displayed horizontally, one above another. A playhead 106 moves from left to right as the musical arrangement is recorded or played. The playhead 106 moves along a timeline that shows the position of the playhead within the musical arrangement. The timeline indicates bars, which can be in beat increments. A transport bar 104 can be displayed and can include command buttons for playing, stopping, pausing, rewinding, and fast-forwarding the displayed musical arrangement. For example, radio buttons can be used for each command. If a user were to select the play button on transport bar 104, the playhead 106 would begin to move along the timeline, e.g., in a left-to-right fashion.

FIG. 1 illustrates an arrangement including multiple software instrument tracks including a Hammer Bass track, Roland CR-78 Kit track, and Aquatic Sunbeam Synthesizer track. FIG. 1 also illustrates a real instrument track, 102, with no effects currently loaded onto the track. FIG. 1 illustrates the tracks and regions in an arrange window.

Each of the displayed MIDI regions in the musical arrangement, as shown in FIG. 1, can be altered using a graphical user interface. For example, a user can cut, copy, paste, or move an audio file or MIDI region on a track so that it plays at a different position in the musical arrangement. Additionally, a user can loop an audio region or MIDI region so that it can be repeated; and/or split an audio region or MIDI region at a given position.

As shown in FIG. 1, a user has selected real instrument track, 102, and no regions using a graphical user interface. In this embodiment, the selection of a real instrument track is shown by shading the selected track. Therefore, the computer determines that a user has chosen a context defined by the selection of the real instrument track and no regions. This context is sent to a connected wireless touch screen device.

Figure 2:
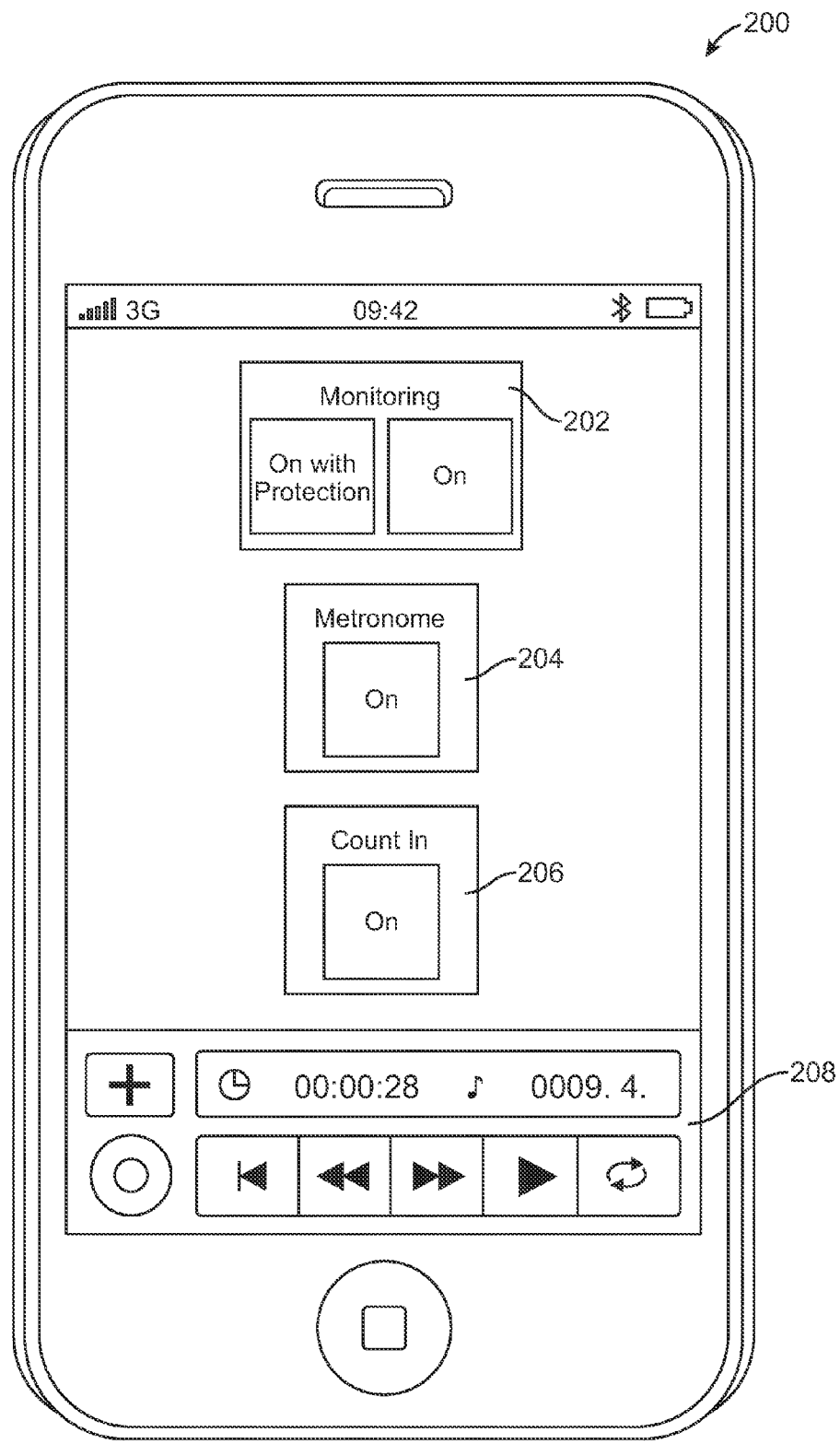
FIG. 2 illustrates a wireless touch screen device displaying one or more commands configured to control the musical arrangement, the commands corresponding to received context data defined by the selection of a real instrument track and no regions.

FIG. 2 illustrates a wireless touch screen device 200 displaying one or more commands configured to control the musical arrangement as shown in FIG. 1, the commands corresponding to received context data defined by the selection of a real instrument track and no regions. The commands include selections for monitoring audio input 202. The selections for monitoring audio input 202 allow a user to turn on monitoring or to turn on monitoring with protection to filter audio peaks exceeding a set volume threshold.

The commands also include a selection to turn a metronome on or off 204. The commands further include a selection to turn "count-in" 206 for a metronome on or off. If this selection is turned on, the metronome will sound a set number of times, such as four beats, as a lead in for recording or other uses.

The commands also include transport control 208. The transport control 208 contains commands for record, rewind, forward, play, cycle region, and other information such as playhead position. By activating the commands shown in FIG. 2, a user can control the arrangement on a DAW as shown in FIG. 1. After a user selects a command, the command is sent to the computer and executed to control the arrangement.

Figure 3:
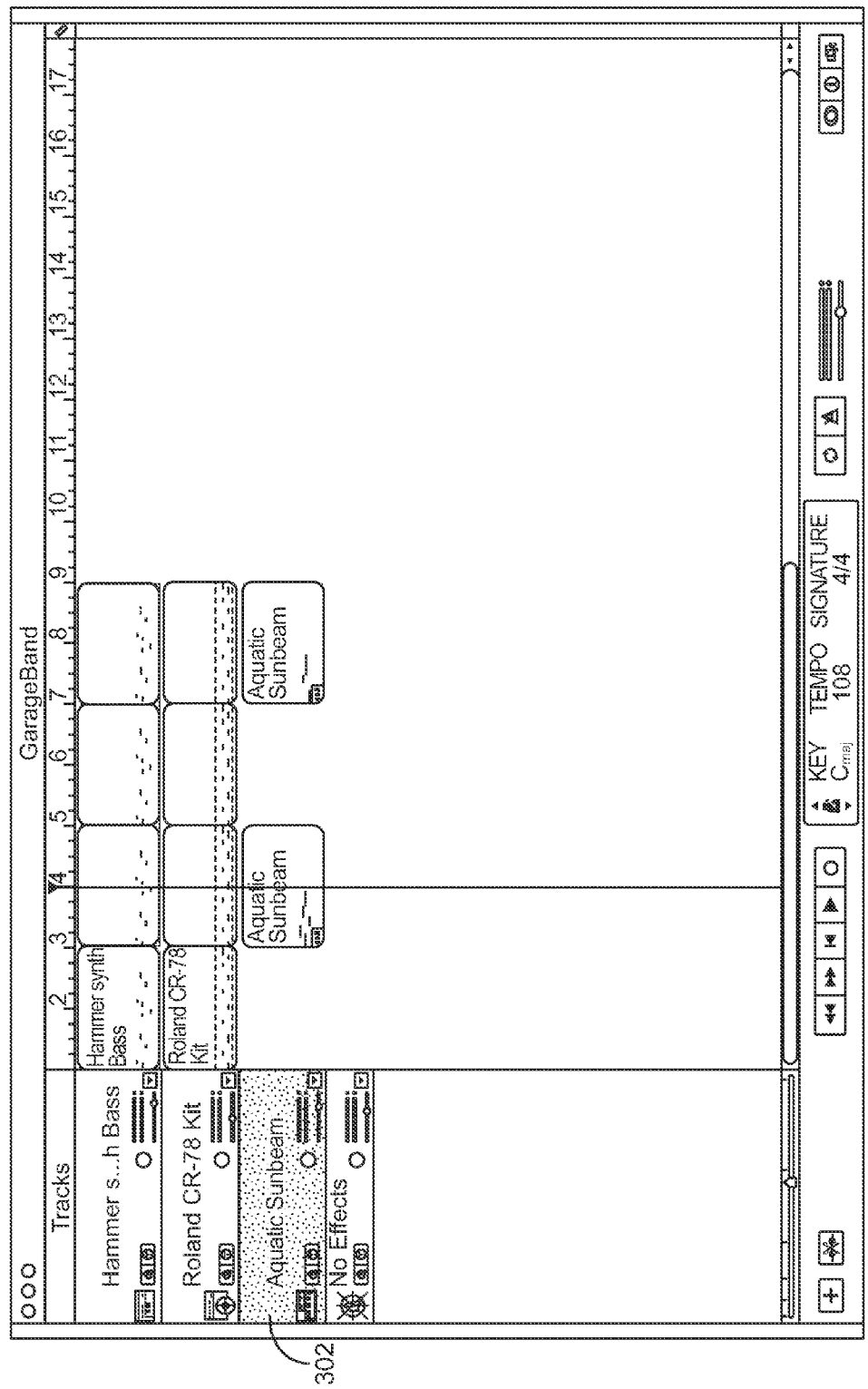
FIG. 3 illustrates the musical arrangement of FIG. 1, in which a user has selected a software instrument track and no regions.

FIG. 3 illustrates the musical arrangement of FIG. 1, in which a user has selected a software instrument track 302 and no regions. An Aquatic Sunbeam Synthesizer software instrument is loaded on software instrument track 302. The selection of the Aquatic Sunbeam Synthesizer software instrument track 302 is shown by shading the selected track. Therefore, the computer determines that a user has chosen a context defined by the selection of the software instrument track and no regions. This context is sent to the connected wireless touch screen device.

Figure 4:
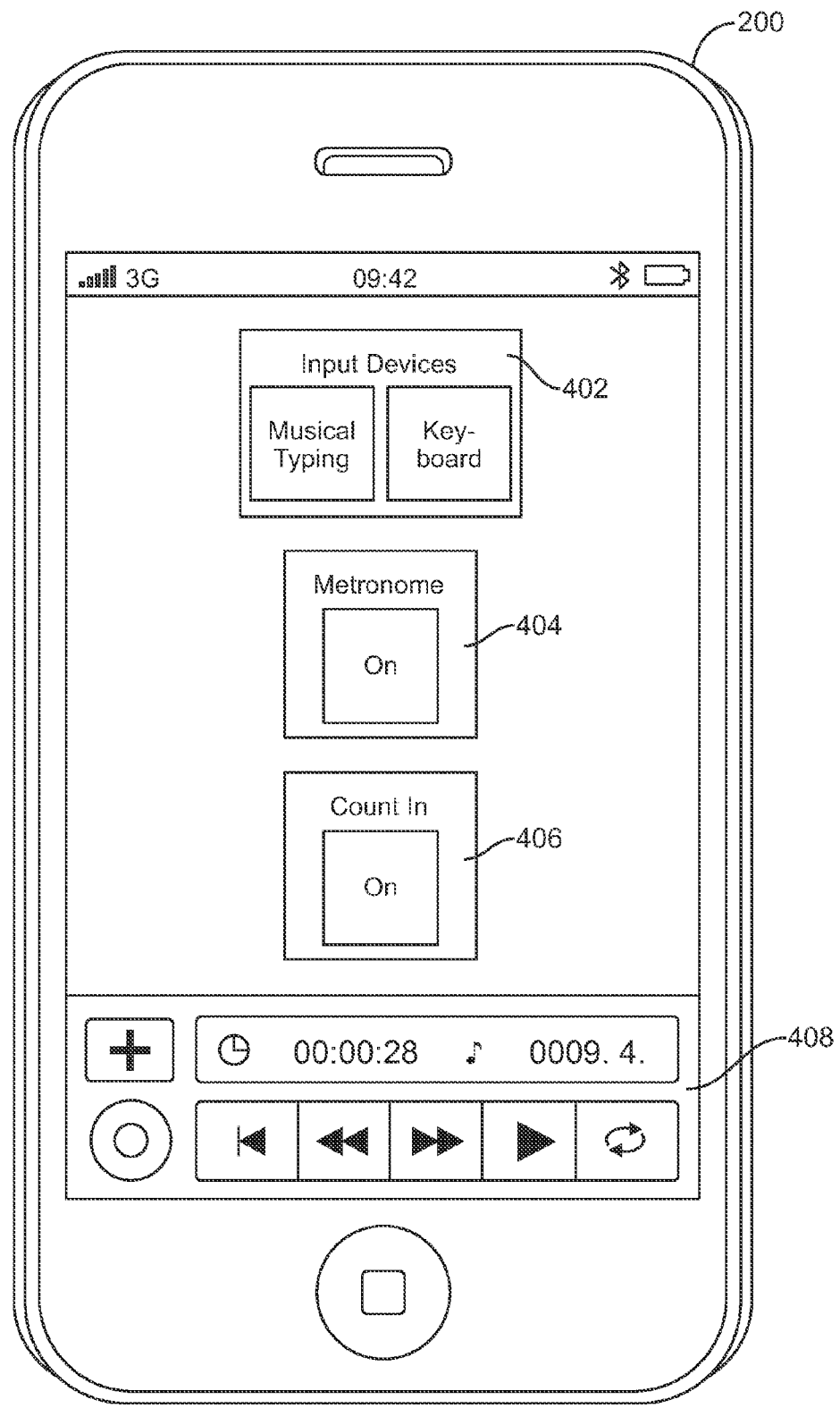
FIG. 4 illustrates a wireless touch screen device displaying one or more commands configured to control the musical arrangement, the commands corresponding to received context data defined by the selection of a software instrument track and no regions.

FIG. 4 illustrates the wireless touch screen device 200 displaying one or more commands configured to control the musical arrangement as shown in FIG. 3, the commands corresponding to received context data defined by the selection of a software instrument track and no regions. The commands include selections for choosing an input device 402. The selections for choosing an input device 402 allow a user to select a musical typing input or keyboard input for the software instrument track selected in FIG. 3. A musical typing input allows a user to input musical MIDI notes using a traditional qwerty computer keyboard. The keyboard input can allow the user to input musical MIDI notes using a mouse on a keyboard input window. The keyboard input can also correspond to a MIDI keyboard controller configured for input into the musical arrangement as shown in FIG. 3.

The commands also include a selection to turn a metronome on or off 404. The commands further include a selection to turn "count-in" 406 for a metronome on or off. If this selection is turned on, the metronome will sound a set number of times, such as four beats, as a lead in for recording or other uses.

The commands also include transport control 408. The transport control 408 contains commands for record, rewind, forward, play, cycle region, and other information such as playhead position. By activating the commands in transport control 408, a user can control the arrangement on a DAW as shown in FIG. 3.

Figure 5:
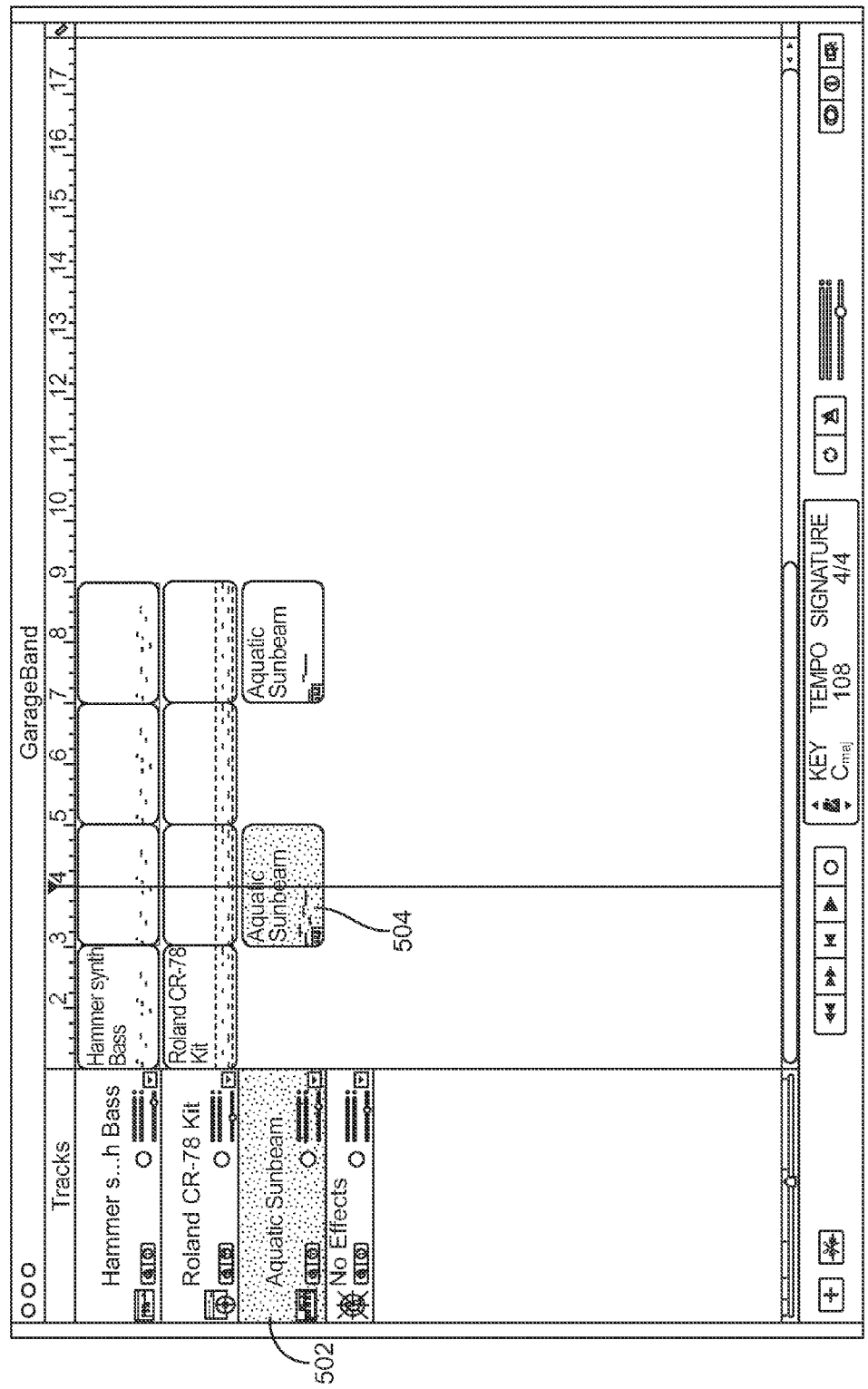
FIG. 5 illustrates the musical arrangement of FIG. 1, in which a user has selected a software instrument track and one region.

FIG. 5 illustrates the musical arrangement of FIG. 1, in which a user has selected a software instrument track 502 and one region 504. An Aquatic Sunbeam Synthesizer software instrument is loaded on software instrument track 502. The selection of the Aquatic Sunbeam Synthesizer software instrument track 502 and one region 504 is shown by shading the selected track and region. Therefore, the computer determines that a user has chosen a context defined by the selection of the software instrument track and one region. This context is sent to the connected wireless touch screen device.

Figure 6:
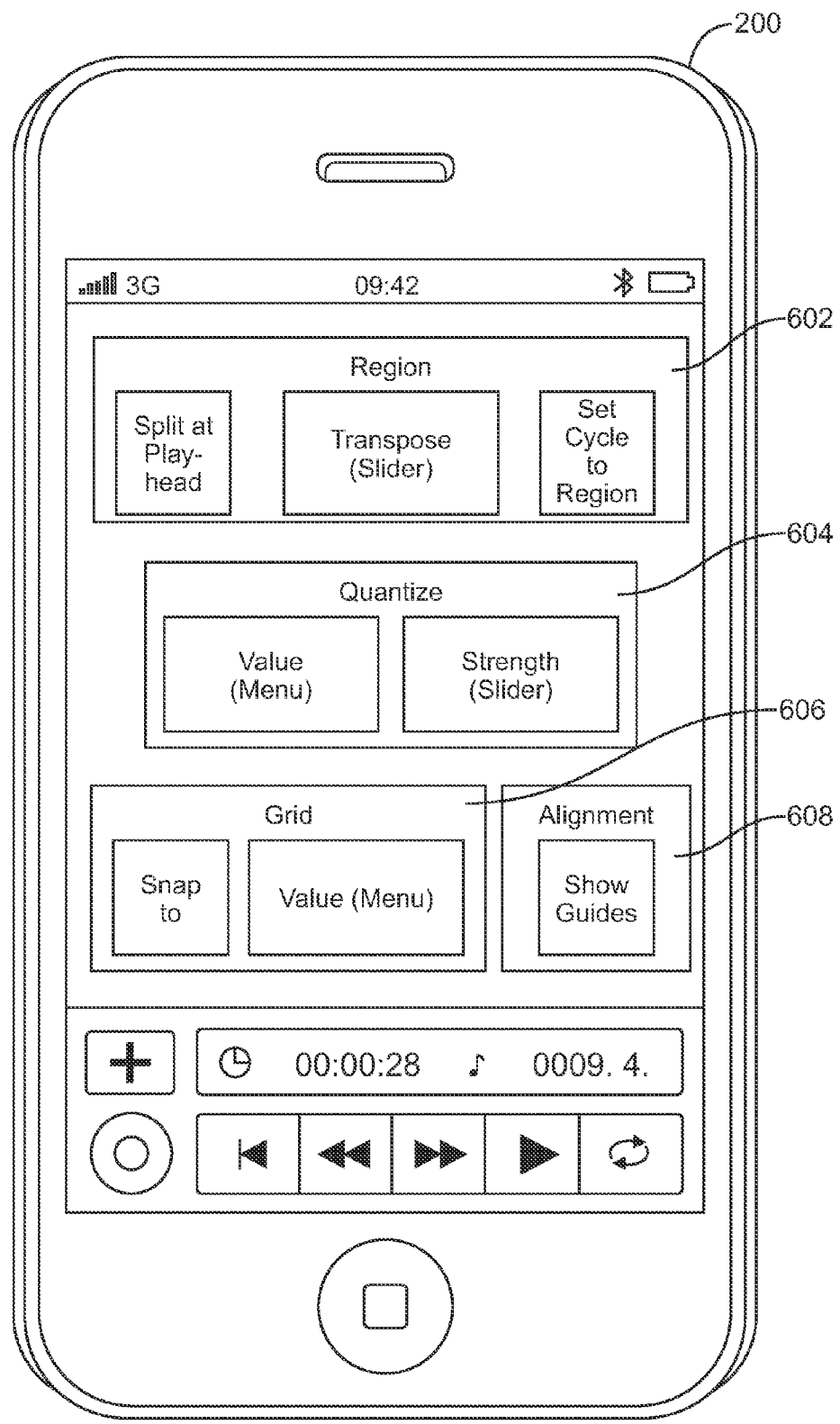
FIG. 6 illustrates a wireless touch screen device displaying one or more commands configured to control the musical arrangement, the commands corresponding to received context data defined by the selection of a software instrument track and one region.

FIG. 6 illustrates the wireless touch screen device 200 displaying one or more commands configured to control the musical arrangement as shown in FIG. 5, the commands corresponding to received context data defined by the selection of a software instrument track and one region. The commands include commands 602 to manipulate a selected region. The commands 602 to manipulate a selected region allow a user to split at playhead, transpose (using a slider), or set to cycle the region 504 selected in FIG. 5. Quantize commands 604 allow a user to set a quantization value and strength for the notes inside the selected region 504 on the selected software instrument track 502 as shown in FIG. 5. In digital music processing technology, quantization is the process of aligning a set of musical notes to a precise setting. This can result in notes being set on beats and on exact fractions of beats, or on another pre-defined grid. A pre-defined quantization grid can be referred to as a "groove template".

The commands also include grid commands 606. The grid commands 606 include "Snap to" and "Value" data entry fields that allow a user to specify grid snap to values for the software instrument track 502 and region 504 as shown in FIG. 5. Snap to a value allows regions to snap to a nearest resolution, for example on moving a region its start position will snap to the nearest quarter-note location on the timeline. Alignment selection 608 allows a user to select if guides are displayed or not on the arrangement as shown in FIG. 5.

Figure 7:
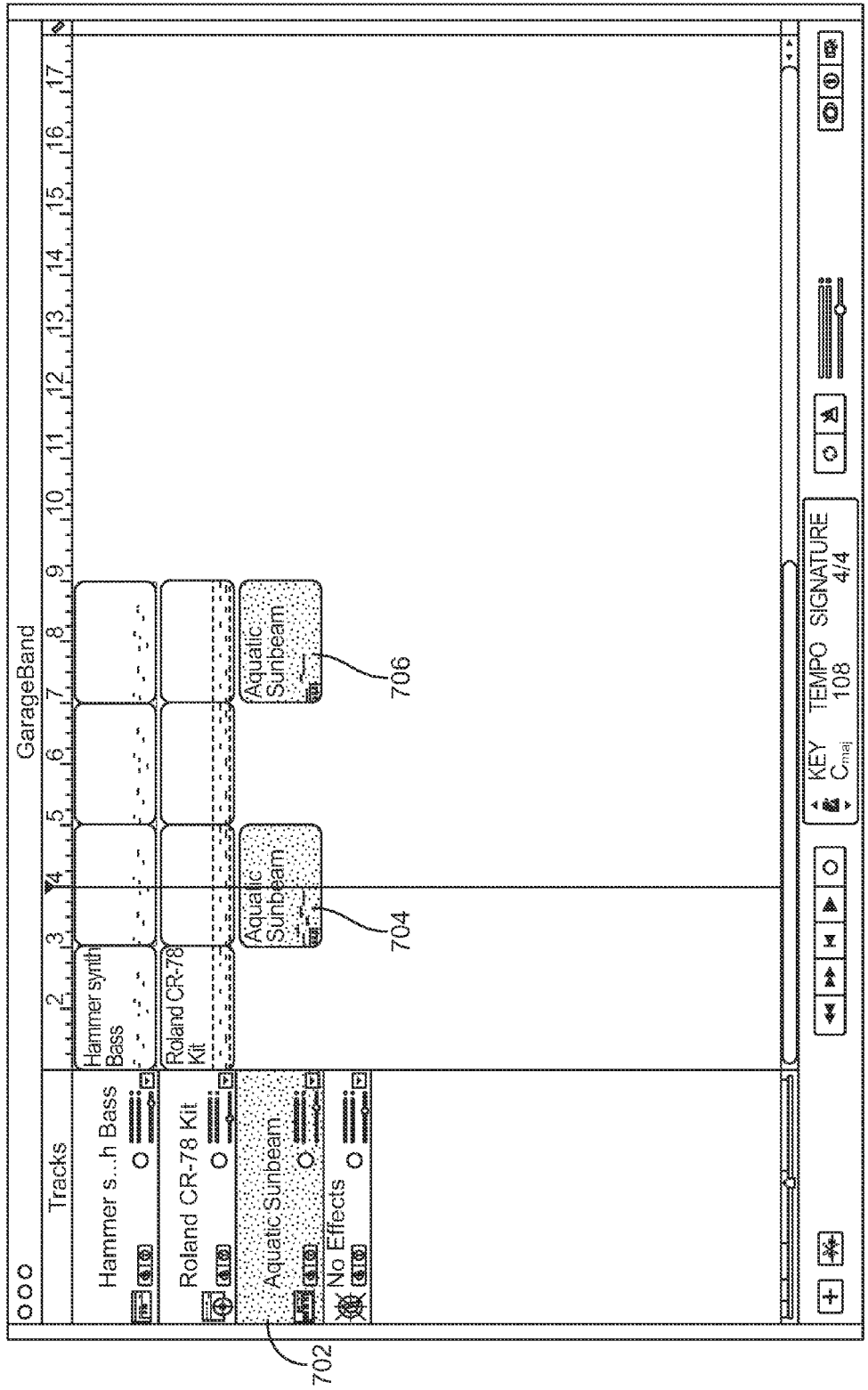
FIG. 7 illustrates the musical arrangement of FIG. 1, in which a user has selected a software instrument track and two regions.

FIG. 7 illustrates the musical arrangement of FIG. 1, in which a user has selected a software instrument track 702 and two regions 704, 706. The selection of the Aquatic Sunbeam Synthesizer software instrument track 702 and two regions 704, 706 is shown by shading the selected track and regions. Therefore, the computer determines that a user has chosen a context defined by the selection of the software instrument track and two regions. This context is sent to the connected wireless touch screen device.

Figure 8:
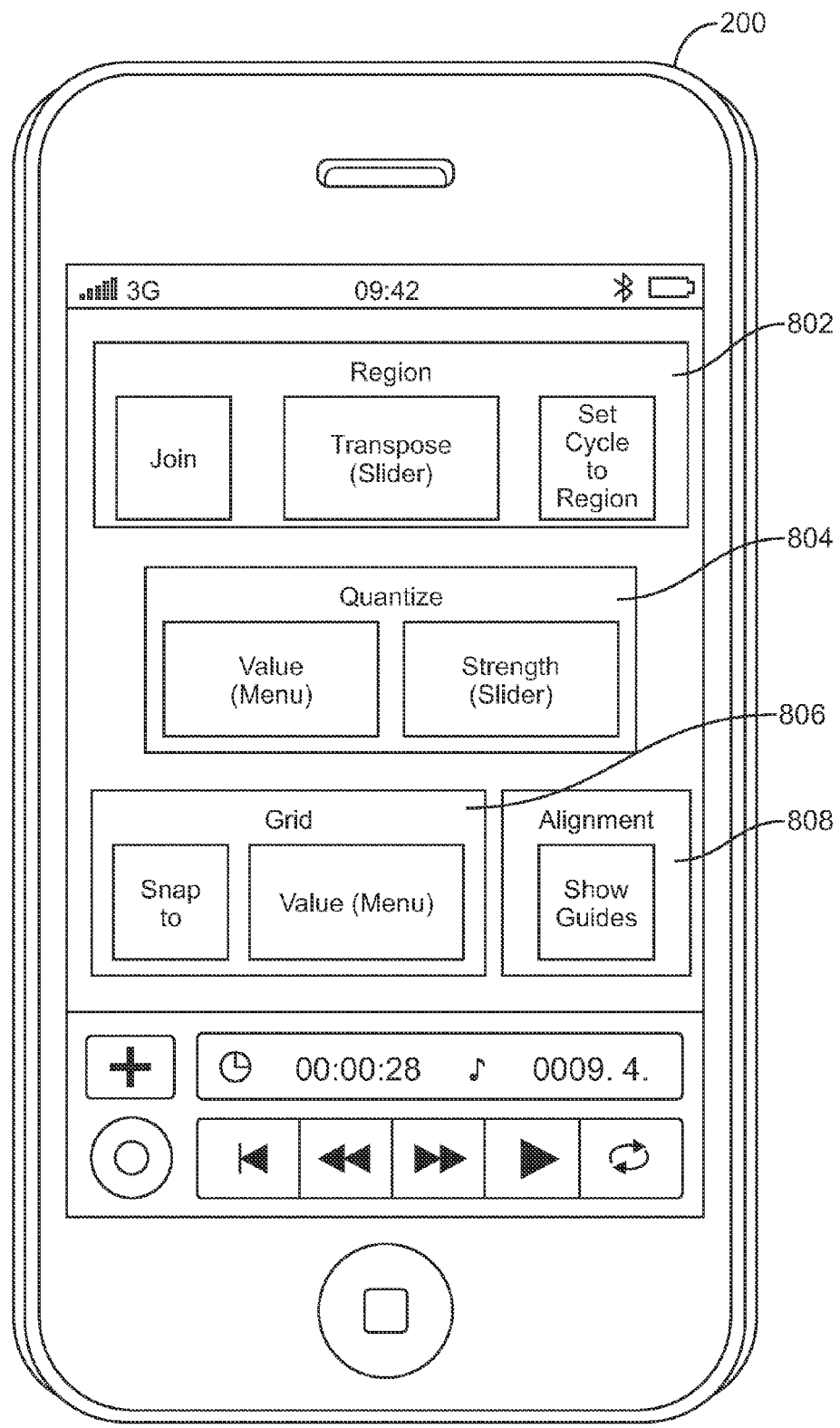
FIG. 8 illustrates a wireless touch screen device displaying one or more commands configured to control the musical arrangement, the commands corresponding to received context data defined by the selection of a software instrument track and two regions.

FIG. 8 illustrates the wireless touch screen device 200 displaying one or more commands configured to control the musical arrangement as shown in FIG. 7, the commands corresponding to received context data defined by the selection of a software instrument track and two regions. The commands include commands 802 to manipulate the selected regions. The commands 802 to manipulate the selected regions allow a user to join the selected regions, transpose (using a slider) the selected regions, or set to cycle the selected regions, as selected in FIG. 7. Quantize commands 804 allow a user to set a quantization value and strength for the notes inside the selected regions 704, 706 on the selected software instrument track 702 as shown in FIG. 7.

The commands also include grid commands 806. The grid commands 806 include "Snap to" and "Value" data entry fields that allow a user to specify grid snap to values for the software instrument track 702 and regions 704, 706 as shown in FIG. 7. Snap to a value allows regions to snap to a nearest resolution, for example on moving a region its start position will snap to the nearest quarter-note location on the timeline. Alignment selection 808 allows a user to select if guides are displayed or not on the arrangement as shown in FIG. 7.

Figure 9:
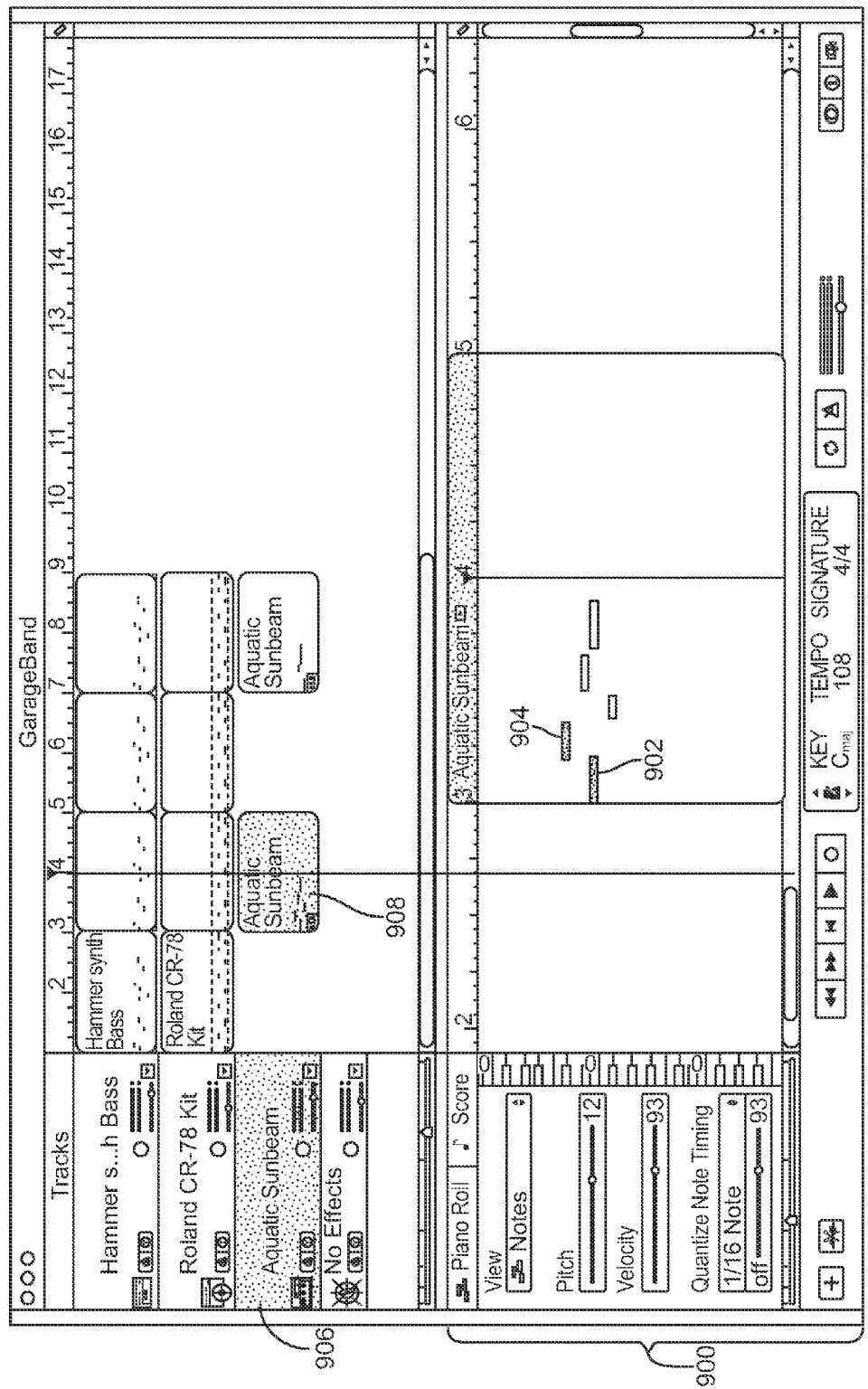
FIG. 9 illustrates the musical arrangement of FIG. 1, in which a user has selected an editor window and two notes.

FIG. 9 illustrates the musical arrangement of FIG. 1, in which a user has selected an editor window 900 and two MIDI notes 902, 904. The MIDI notes 902, 904 are within region 908 on Aquatic Sunbeam Synthesizer software instrument track 906. Therefore, the computer determines that a user has chosen a context defined by the selection of the editor window and two MIDI notes within the editor window. This context is sent to the connected wireless touch screen device.

Figure 10:
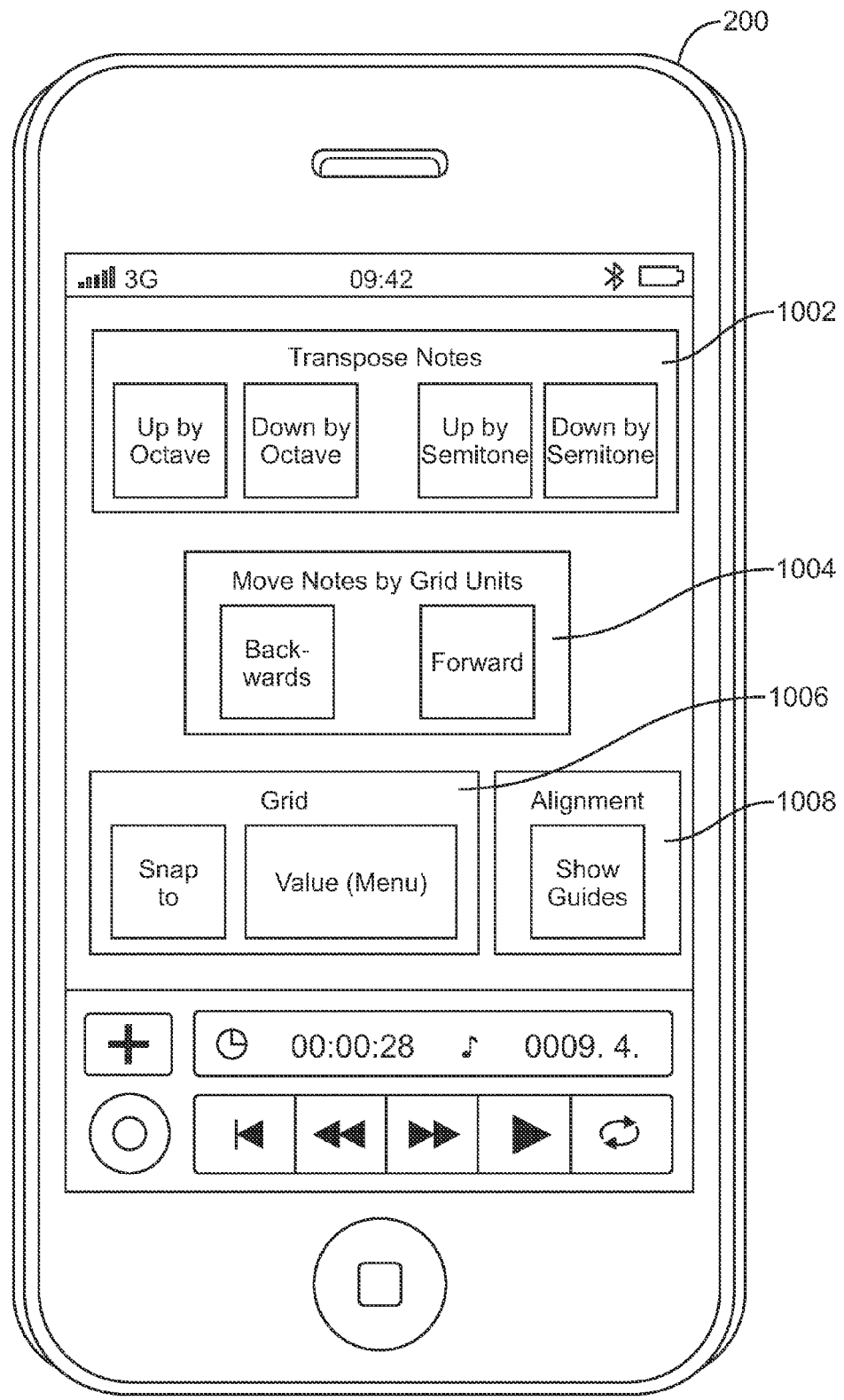
FIG. 10 illustrates a wireless touch screen device displaying one or more commands configured to control the musical arrangement, the commands corresponding to received context data defined by the selection of an editor window and two notes.

FIG. 10 illustrates the wireless touch screen device 200 displaying one or more commands configured to control the musical arrangement as shown in FIG. 9, the commands corresponding to received context data defined by the selection of an editor window and two notes. The commands include commands 1002 to manipulate the selected notes 902, 904. The commands 1002 to manipulate the selected notes allow a user to transpose the selected notes up by an octave, down by an octave, up by a semitone, or down by a semitone. Larger transpositions can be achieved by repeatedly using these commands.

The commands include 1004 to move notes by grid units. The move notes by grid units command 1004 allows a user to move selected notes 902, 904 backwards or forwards in the arrangement by a selected grid value, which can be set with the "Value" data entry field of the grid commands 1006. This would, for example if the grid value is set to quarter notes, allow a user to shift quarter notes on the first and second beat of a bar to the second and third beat of the bar by selecting the forward command.

The commands also include grid commands 1006. The grid commands 1006 include "Snap to" and "Value" data entry fields that allow a user to specify grid snap to values for the notes 902, 904 in region 908 on software instrument track 906 as shown in FIG. 9. Snap to a value allows notes to snap to a nearest resolution, for example on moving a note its start position will snap to their nearest quarter-note location on the timeline. Alignment selection 1008 allows a user to select if guides are displayed or not on the arrangement as shown in FIG. 9.

Figure 11:
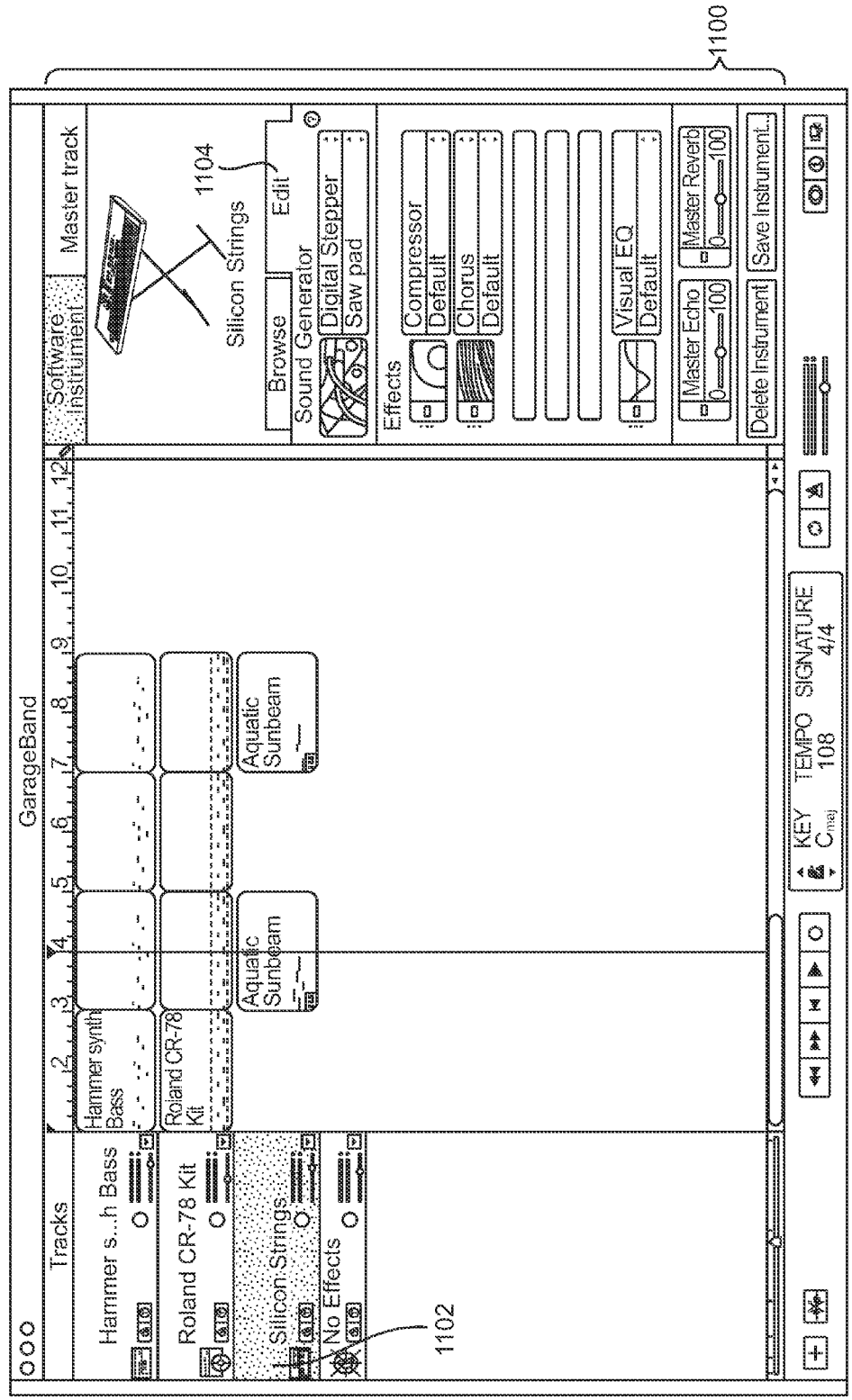
FIG. 11 illustrates the musical arrangement of FIG. 1, in which a user has selected a track info edit window.

FIG. 11 illustrates the musical arrangement of FIG. 1, in which a user has selected track info edit tab 1104 in the track info window 1100. The computer determines that a user has chosen a context defined by the selection the track info edit window 1100. The track info edit window 1100 allows a user to choose a sound generator, effects such as compression and chorus, graphical equalization settings, echo settings and reverb settings. This context is sent to the connected wireless touch screen device.

Figure 12:
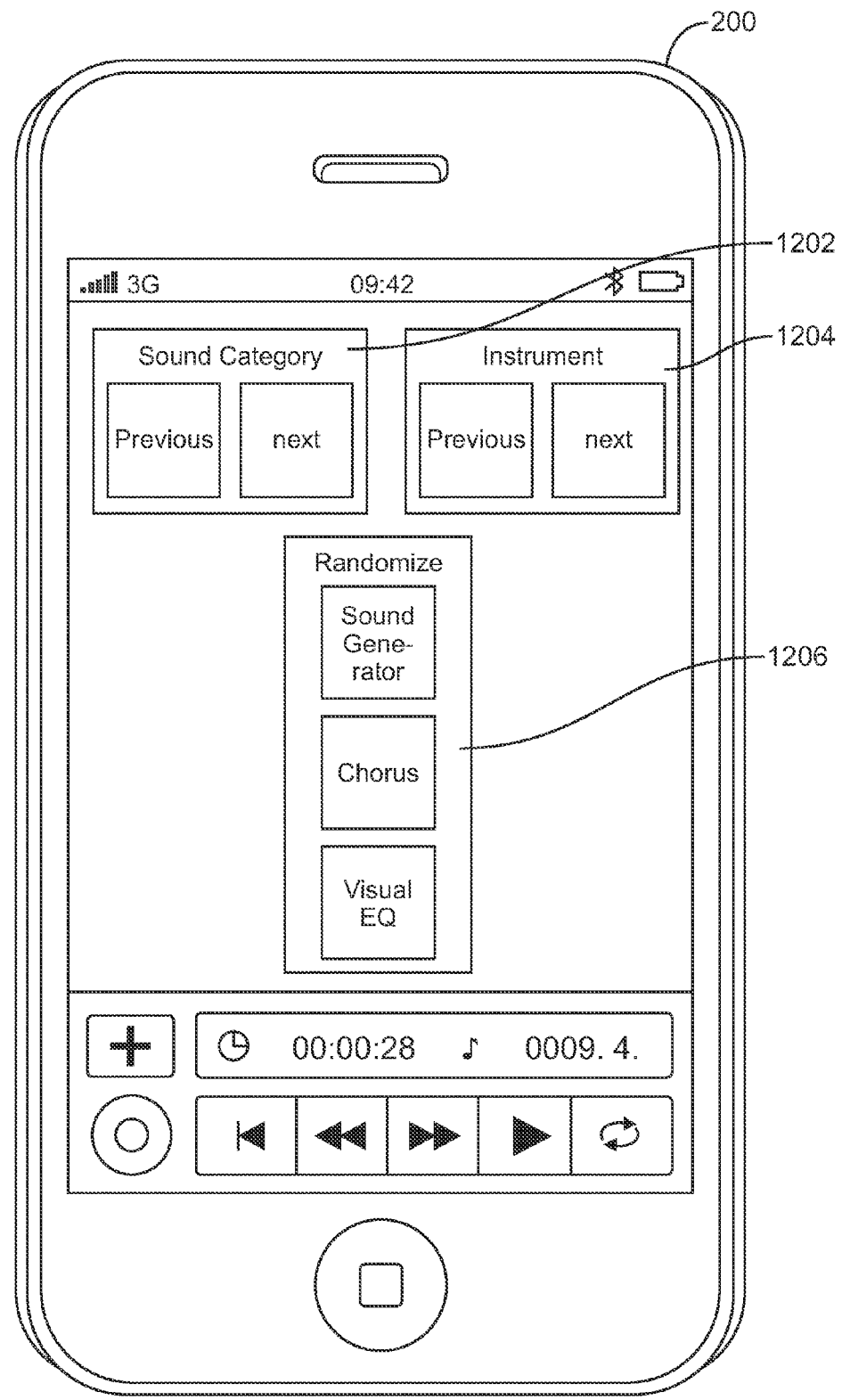
FIG. 12 illustrates a wireless touch screen device displaying one or more commands configured to control the musical arrangement, the commands corresponding to received context data defined by the selection of a track info edit window.

FIG. 12 illustrates the wireless touch screen device 200 displaying one or more commands configured to control the musical arrangement as shown in FIG. 11, the commands corresponding to received context data defined by the selection of a track info edit window 1100. The commands include commands 1202 to go to a previous or next sound category. A sound category can be a group of sounds such as guitars, synthesizers, drums, etc.

The commands include commands 1204 to go to a previous or next instrument within a sound category. This would, for example, allow a user to cycle through available synthesizer software instruments in a synthesizer sound category.

The commands also include commands 1206. The commands 1206 allow a user to randomize the settings for the sound generator, the chorus, and/or the visual equalization for the selected track edit window 1100 corresponding to software instrument track 1102 as shown in FIG. 11. Upon selection of a command as shown in FIG. 12 by a user, the wireless touch screen device 200 will send data to the computer displaying the arrangement of FIG. 11, and the computer will execute the command to cause control and modifications of the software instrument track settings for track 1102.

Figure 13:
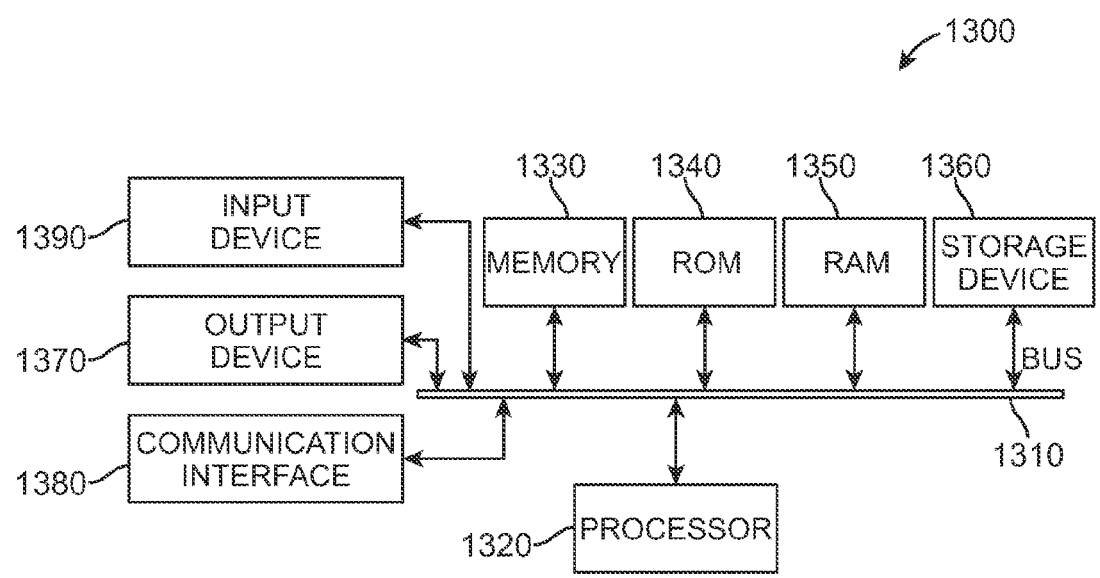
FIG. 13 illustrates an example wireless touchscreen device for communicatively coupling with a computer.

FIG. 13 illustrates the basic hardware components associated with the device embodiment of the disclosed technology. FIG. 13 shows a general-purpose computing device 1300, including a processor, or processing unit (CPU) 1320 and a system bus 1310 that couples various system components including the system memory such as read only memory (ROM) 1340 and random access memory (RAM) 1350 to the processing unit 1320. Other system memory 1330 may be available for use as well. It will be appreciated that the disclosed technology may operate on a computing device with more than one CPU 1320 or on a group or cluster of computing devices networked together to provide greater processing capability. The system bus 1310 may be any of several types of bus structures including a memory bus or memory controller, a peripheral bus, and a local bus using any of a variety of bus architectures. A basic input/output (BIOS) stored in ROM 1340 or the like, may provide the basic routine that helps to transfer information between elements within the computing device 1300, such as during start-up. The computing device 1300 further includes storage devices such as a hard disk drive 1360, a magnetic disk drive, an optical disk drive, tape drive or the like. The storage device 1360 is connected to the system bus 1310 by a drive interface. The drives and the associated computer readable media provide nonvolatile storage of computer readable instructions, data structures, program modules and other data for the computing device 1300. The basic components are known to those of skill in the art and appropriate variations are contemplated depending on the type of device, such as whether the device is a small, handheld computing device, a desktop computer, or a computer server.

Although the exemplary device described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 1300, an input device 1390 represents any number of input mechanisms such as a touch-sensitive screen for gesture or graphical input and a wireless receiver. The device output 1370 can also be one or more of a number of output mechanisms known to those of skill in the art, such as a display and wireless transmitter. In some instances, multimodal systems enable a user to provide multiple types of input to communicate with the computing device 1300. The communications interface 1380 generally governs and manages the user input and system output. There is no restriction on the disclosed technology operating on any particular hardware arrangement and therefore the basic features here may easily be substituted for improved hardware or firmware arrangements as they are developed.

For clarity of explanation, the illustrative device embodiment is presented as comprising individual functional blocks (including functional blocks labeled as a "processor"). The functions these blocks represent may be provided through the use of either shared or dedicated hardware, including but not limited to hardware capable of executing software. For example the functions of one or more processors shown in FIG. 13 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 14:
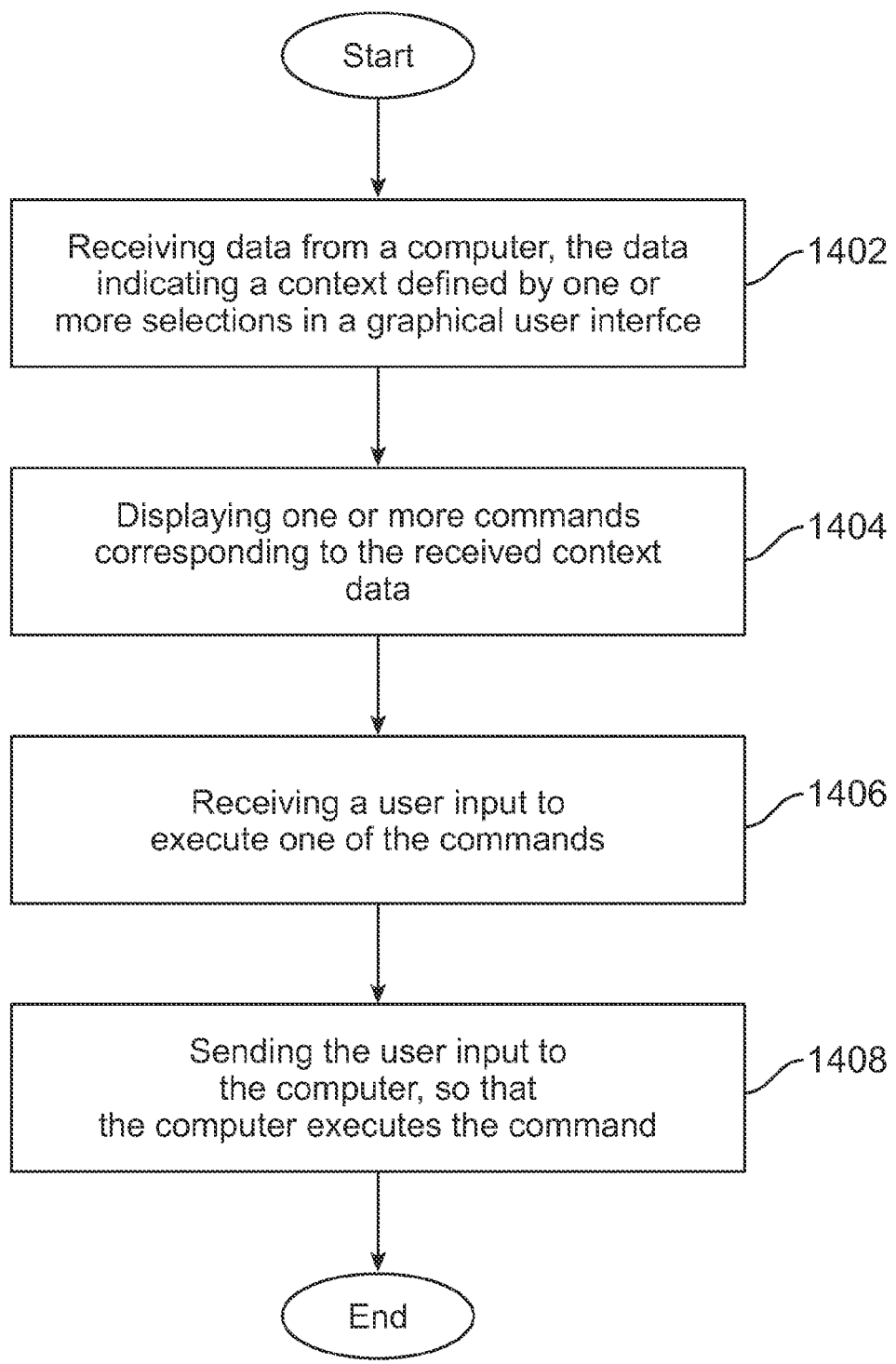
FIG. 14 illustrates an example method for communicatively coupling a wireless touch screen device and a computer running software.

FIG. 14 illustrates an example method for communicatively coupling a wireless touch screen device and a computer running software. The method includes receiving data from a computer 1402, the data indicating a context defined by one or more selections made by a user in a graphical user interface. The method includes displaying one or more commands 1404 on the wireless touch screen device. These commands correspond to the received context data. In other words, these commands have been pre-defined as appropriate for display and controlling a computer program, such as a DAW, based on the context defined by selections made in the graphical user interface.

The method includes receiving a user input 1406 on the touch screen device to execute one of the displayed commands. The method includes sending the user input to the computer 1408, so that the computer executes the command. The command controls and modifies the program running on the computer. In this manner, the handheld wireless device acts as an auxiliary input for the computer running software and automatically presents commands appropriate for a user-selected context. The user selected context is defined by the selections made in the graphical user interface.

In one example, a context is defined by the selection of a real instrument track and no regions in an arrange window. Another context is defined by the selection of a software instrument track in an arrange window and no regions. An additional context is defined by the selection of a software instrument track and one region on the software instrument track in an arrange window. An additional context is defined by the selection in a graphical user interface of a software instrument track and two regions on the software instrument track in an arrange window.

Another context is defined by the selection in a graphical user interface of one or more notes in an editor window. Another context is defined by one or more selections in a software instrument track info edit window.

An additional context can be defined by the selection of one region on a real instrument track. Another context can be defined by the selection of multiple regions on a real instrument track in a graphical user interface.

The graphical user interface on the computer in the example method can correspond to an audio editing application program or digital audio workstation (DAW) program. In another example, it can correspond to a video editing application, a photo editing application, and a word processing application.

FIG. 15 illustrates an example system for communicatively coupling a wireless touch screen device and a computer running software. The system 1500 includes a wireless touch screen device 1502 engaged in two-way wireless communication with personal computer 1504. The two-way wireless communication can occur over a shared WiFi network. The two-way wireless communication can also occur over a Bluetooth connection, or over any other suitable wireless communication method.

The personal computer 1504 receives one or more selections made in a graphical user interface, which can be defined as a context. The computer then sends data representative of the one or more selections to the wireless touch screen device 1502. The wireless touch screen device 1502 then displays pre-determined commands corresponding to the received data. The pre-determined commands are chosen by a software designer as commands appropriate for manipulating or controlling the selections made in the graphical user interface of personal computer 1504.

In this example, the wireless touch screen device 1502 is further configured to receive a user input to execute one of the displayed commands. In this example, a user can touch one of the icons displayed on touch screen device 1502 with a finger or appropriate stylus. Upon receiving this user input, wireless touch screen device 1502 will send a wireless signal to the personal computer 1504, wherein the computer is configured to execute the received command. This allows the wireless touch screen device 1502 to act as an additional input for personal computer 1504.

In the system of FIG. 15, a context is defined by the selection of a real instrument track in an arrange window in a graphical user interface on personal computer 1504. Another context is defined by the selection of a software instrument track in an arrange window on personal computer 1504. Another context is chosen by the selection of a software instrument track and one region on the software instrument track in an arrange window in a graphical user interface on personal computer 1504. Another context is defined by the selection of a software instrument track and two regions on the software instrument track in an arrange window on a graphical user interface on computer 1504.

Another context is defined by the selection by a user of one or more notes in an editor window. Another context is defined by the selection by a user of one or more items in a software instrument track info edit window.

The personal computer 1504 of system 1500 can run an application such as a digital audio workstation, digital video editor, digital photo editor, and word processor. A graphical user interface displayed by personal computer 1504 can correspond to the digital video editor, digital photo editor, or word processor application or programming running on personal computer 1504.

The technology can take the form of an entirely hardware-based embodiment, an entirely software-based embodiment, or an embodiment containing both hardware and software elements. In one embodiment, the disclosed technology can be implemented in software, which includes but may not be limited to firmware, resident software, microcode, etc. Furthermore, the disclosed technology can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers may not be included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk read only memory (CD-ROM), compact disk read/write (CD-R/W), and DVD. Both processors and program code for implementing each as aspects of the technology can be centralized and/or distributed as known to those skilled in the art.

The above disclosure provides examples within the scope of claims, appended hereto or later added in accordance with applicable law. However, these examples are not limiting as to how any disclosed embodiments may be implemented, as those of ordinary skill can apply these disclosures to particular situations in a variety of ways.

What is claimed is:

1. A method for using a handheld wireless touch screen device as an input device for a computer comprising:
receiving, at the device, context data from the computer running an audio computer software program, the context data indicating a context defined by a first selection of a first user interface element that represents a first audio digital multimedia content item of a first type and a second selection of a second user interface element that represents a second digital multimedia content item of a second type that is different from the first type, wherein the first user interface element and the second user interface element are displayed in a graphical user interface by the computer in response to running the audio computer software program; and
selecting, by the device, one or more commands corresponding to the received context data defined by the first selection and the second selection, wherein the selected one or more commands are executable by the computer to control the first audio digital multimedia content item of the first type and the second digital multimedia content item of the second type, respectively, wherein the selected commands include at least the most frequently chosen commands by a user for the indicated context and at least one available command for the indicated context is excluded.

2. The method of claim 1, wherein the first selection and the second selection are selected from a group consisting of a real instrument track in an arrange window, a software instrument track in an arrange window, a software instrument track and one region on the software instrument track in an arrange window, a software instrument track and two regions on the software instrument track in an arrange window, a real instrument track and one region in an arrange window, and a real instrument track and multiple regions in an arrange window.

3. The method of claim 1, wherein the audio computer software program comprises a digital audio workstation.

4. The method of claim 1, wherein the first selection and the second selection are selected from a group consisting of one or more notes in an editor window and first selection and the second selection in a software instrument track info edit window.

5. The method of claim 1, further comprising storing, at the device, one or more commands in a frequently selected command list in memory for the received context.

6. A device comprising:
a processor configured to receive context data from a computer running an audio computer software program, wherein the context data includes a first selection of a first user interface element that represents a first audio digital multimedia content item of a first type and a second selection of a second user interface element that represents a second digital multimedia content item of a second type that is different from the first type, wherein the first user interface element and the second user interface element are made in a graphical user interface displayed by the computer in response to running the audio computer software program; and
the processor configured to select one or more commands corresponding to the received context data, wherein the selected one or more commands are executable by the computer to control the first audio digital multimedia content item of the first type and the second digital multimedia content item of the second type, respectively, wherein the selected commands include only the most frequently chosen commands by a user for the first selection and the second selection.

7. The device of claim 6, wherein the first selection and the second selection are selected from a group consisting of a real instrument track in an arrange window, a software instrument track in an arrange window, a software instrument track and one region on the software instrument track in an arrange window, a software instrument track and two regions on the software instrument track in an arrange window, a real instrument track and one region in an arrange window, and a real instrument track and multiple regions in an arrange window.

8. The device of claim 6, wherein the first selection and the second selection are selected from a group consisting of one or more notes in an editor window and first selection and the second selection in a software instrument track info edit window.

9. The device of claim 6, wherein the graphical user interface on the computer corresponds to the audio computer software program comprising an audio editing application.

10. A system comprising:
a computer configured to perform operations comprising:
running an audio computer software program,
displaying a graphical user interface including a first user interface element and a second user interface element in response to running the program,
receiving, in the graphical user interface, a first selection of a first user interface element that represents a first audio digital multimedia content item of a first type and a second selection of a second user interface element that represents a second digital multimedia content item of a second type that is different from the first type, and
sending context data representative of the first selection and the second selection; and
a wireless touch screen device communicatively coupled to the computer, the wireless touch screen device configured to perform operations comprising:
receiving the context data representative of the first selection and the second selection from the computer,
selecting one or more commands corresponding to the received context data, wherein the selected one or more commands are executable by the computer to control the first audio digital multimedia content item of the first type and the second digital multimedia content item of the second type, respectively, wherein the selected commands include at least the most frequently chosen commands by a user for the first selection and the second selection and at least one available command for the first selection and the second selection is excluded, and
displaying the selected commands corresponding to the received data.

11. The system of claim 10, wherein the wireless device is further configured to perform operations comprising receiving a user input to execute one of the displayed commands and sending a signal to the computer, and wherein the computer is configured to perform operations comprising executing the received command.

12. The system of claim 10, wherein the first selection and the second selection are selected from a group consisting of a real instrument track in an arrange window, a software instrument track in an arrange window, a software instrument track and one region on the software instrument track in an arrange window, a software instrument track and two regions on the software instrument track in an arrange window, a real instrument track and one region in an arrange window, and a real instrument track and multiple regions in an arrange window.

13. The system of claim 10, wherein the first selection and the second selection are selected from a group consisting of one or more notes in an editor window and first selection and the second selection in a software instrument track info edit window.

14. The system of claim 10, wherein the audio computer software program comprises a digital audio workstation.

15. A non-transitory computer readable medium storing instructions for displaying commands on a wireless touch screen device, the instructions comprising:
receiving context data from a computer running an audio computer software program, the context data indicating a first selection of a first user interface element that represents a first audio digital multimedia content item of a first type and a second selection of a second user interface element that represents a second digital multimedia content item of a second type that is different from the first type, wherein the first user interface element and the second user interface element are displayed in a graphical user interface by the computer in response to running the audio computer software program;
selecting one or more commands corresponding to the received data, wherein the selected one or more commands are executable by the computer to control the first audio digital multimedia content item of the first type and the second digital multimedia content item of the second type, respectively, wherein the selected commands include at least the most frequently chosen commands by a user for the first selection and the second selection and at least one available command for the first selection and the second selection is excluded;
displaying the selected commands corresponding to the received data on the wireless touch screen device;
receiving a user command on the wireless touch screen device to execute one of the selected commands; and
sending the user command to the computer.

16. The non-transitory computer readable medium of claim 15, wherein the first selection and the second selection are selected from a group consisting of a real instrument track in an arrange window, a software instrument track in an arrange window, a software instrument track and one region on the software instrument track in an arrange window, a software instrument track and two regions on the software instrument track in an arrange window, a real instrument track and one region in an arrange window, and a real instrument track and multiple regions in an arrange window.

17. The non-transitory computer readable medium of claim 15, wherein the first selection and the second selection are selected from a group consisting of one or more notes in an editor window and one or more selections in a software instrument track info edit window.

18. The non-transitory computer readable medium of claim 15, wherein the audio computer software program comprises an audio editing application.

19. The method of claim 1, further comprising:
displaying the selected one or more commands on the touch screen included in the device, wherein the commands control the audio computer software program on the computer;
receiving a user input on the touch screen to execute one of the one or more commands; and
sending the user input to the computer, wherein the computer executes the command and controls the program according to the user input.

20. The method of claim 1, wherein the first type includes a musical instrument digital interface (MIDI) data that play through a software instrument, and the second type includes recording of real audio.

21. The device of claim 6, wherein:
the processor configured to display the selected commands, on a touch screen display included in the device, wherein the commands control the program on the computer;
the processor configured to receive a user command on the touch screen included in the device to execute one of the one or more commands; and
the processor configured to send the user command to the computer, wherein the computer executes the command and controls the program according to the user command.

22. The device of claim 6, wherein the first type includes a musical instrument digital interface (MIDI) data that play through a software instrument, and the second type includes recording of real audio.

23. The system of claim 10, wherein the first type includes a musical instrument digital interface (MIDI) data that play through a software instrument, and the second type includes recording of real audio.

24. The medium of claim 15, wherein the first type includes a musical instrument digital interface (MIDI) data that play through a software instrument, and the second type includes recording of real audio.

* * * * *